March 19, 1968  T. G. WRIGHT  3,374,078
APPARATUS FOR SUPPORTING AND HEATING GLASS SHEETS ON A GAS BED
Filed Dec. 24, 1964  4 Sheets-Sheet 1

INVENTOR.
THOMAS G. WRIGHT

ATTORNEYS

INVENTOR.
THOMAS G. WRIGHT
BY Chisholm and Spencer
ATTORNEYS

March 19, 1968 T. G. WRIGHT 3,374,078
APPARATUS FOR SUPPORTING AND HEATING GLASS SHEETS ON A GAS BED
Filed Dec. 24, 1964 4 Sheets-Sheet 3

INVENTOR.
THOMAS G. WRIGHT
BY Chisholm and Spencer
ATTORNEYS

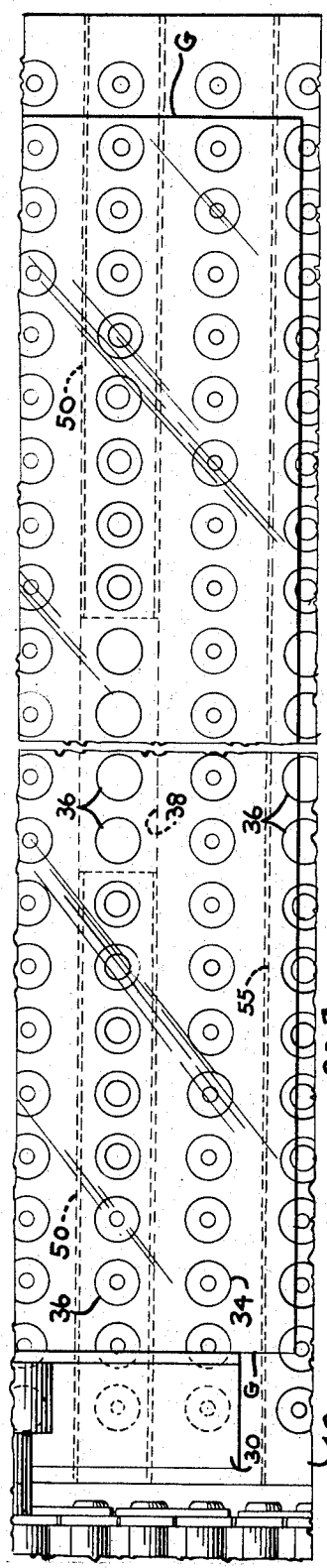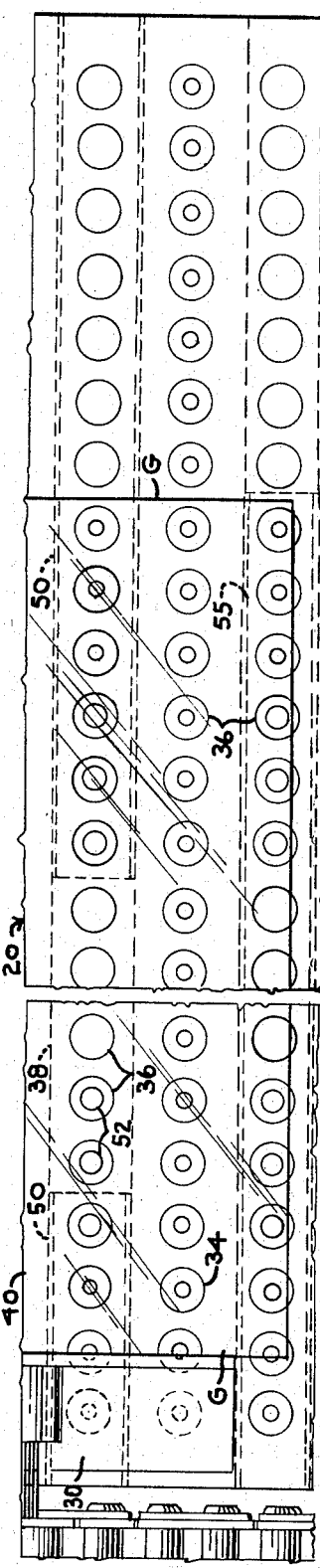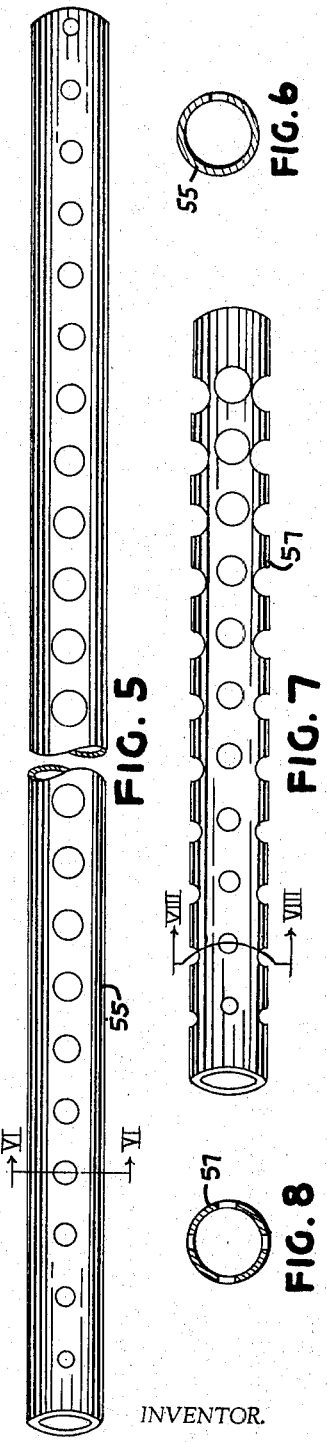

United States Patent Office 3,374,078
Patented Mar. 19, 1968

3,374,078
APPARATUS FOR SUPPORTING AND HEATING GLASS SHEETS ON A GAS BED
Thomas G. Wright, Pittsburgh, Pa., assignor to Pittsburgh Plate Glass Company, Pittsburgh, Pa., a corporation of Pennsylvania
Filed Dec. 24, 1964, Ser. No. 421,028
6 Claims. (Cl. 65—182)

ABSTRACT OF THE DISCLOSURE

An apparatus for uniformly supporting glass sheets of different widths on a fluid support provided by flowing fluid from outlets in a bed thence across the bed and through exhaust conduits in which a removable member having orifices some of which are smaller than the exhaust outlets are detachably mounted below the bed and positioned so that a small orifice in the member cooperates with an exhaust gas outlet to restrict the flow of exhaust gas from the exhaust conduit.

This invention relates to methods and apparatus for treating sheet material and more specifically to methods and apparatus for providing fluid support for sheets of glass.

Glass sheets may be fabricated into finished products, such as automobile windows and architectural panels, by bending, tempering or coating the glass sheets or by a combination of such treatments to impart new characteristics to the glass sheets, making them more suitable for their intended purpose. Common to the fabricating techniques of bending, tempering, or coating sheets of glass is the need for heating the glass sheets to a temperature above that at which the sheets will readily deform through viscous flow of the glass, ie., to a temperature of about 980 degrees Fahrenheit and above (hereinafter referred to as the "deformation temperature").

Advantageously, glass sheets may be uniformly supported upon a flow of gas while the glass sheets are at a deformation temperature in order to prevent undesirable deformation of the sheets. Furthermore, such support readily facilitates changing the shape of a heat-softened glass sheet in a controlled manner. In addition, the supporting gas serves as a medium for the transfer of heat to the glass during heating and from the glass during cooling.

One manner of supporting sheets of glass upon a flow of gas while heating the sheets to a deformation temperature is to provide an elongated support bed through which gas at deformation temperature of the glass is supplied and over which the sheets are supported and conveyed. Heat is applied above the glass, as by radiant burners. The sheets of glass are supported upon a flow of gas emitted through spaced rows of spaced supply holes extending along and across the support bed that forms the top of a plenum chamber or reservoir for the gas. Between the spaced rows of supply holes along the bed are alternate rows of exhaust holes each of which communicate with an exhaust manifold beneath the surface of the bed. Gas introduced through the support bed and beneath a supported glass sheet is removed through the rows of exhaust holes between the rows of supply holes to zones of lower pressure. The gas support bed is in part enclosed within a furnace and provides an elongated path of travel along which the gas supported glass sheets are conveyed as they are heated and further processed.

The exhaust holes adjacent the two longitudinally extending edges of the support bed should be of reduced size with respect to the exhaust holes located centrally of the bed width to reduce the exhaust area beneath the periphery of the glass sheet. This compensates for the lateral flow and escape of support gas from beneath the sheet about the periphery, and thereby helps to maintain a uniform pressure across the bed.

Most advantageously, the support bed is tilted at a slight angle from the horizontal transversely of the bed to facilitate conveying of the glass sheets. This orients an edge of each sheet along a reference line and facilitates frictional engagement between the sheets and a conveying mechanism, for example, a chain running along the lower longitudinally extending edge of the bed.

In accordance with the present invention, improved methods and apparatus have been devised for providing uniform and proper support for sheets of glass of different widths on the same support bed and particularly to permit uniform support of different widths of sheets while retaining the location of one edge of the supported sheet along a fixed reference edge, for example, along the lower edge of the gas support bed. Basically, this is accomplished by variably controlling the flow of gas through the exhaust outlets across the bed so that the flow of gas through the exhaust outlets may be selectively decreased at locations across the bed that lie beneath the longitudinally extending edges of sheets of glass of varying widths. In this manner, more uniform support of the glass sheets may be attained for varying widths of sheets and without regard to their asymmetrical placement with respect to the center line of the bed. This particularly assures that deformable glass sheets may be supported in the desired contour, as predetermined by the shape of the bed surface.

More specifically, a uniform supporting pressure is obtained with different sized sheets of glass indexed along a lower edge portion of the gas supported bed by selectively diminishing the effective size of the exhaust holes extending across the support bed in accordance with the width of the glass sheets to be supported so that the exhaust holes beneath the longitudinally extending edges of the supported sheets have a smaller effective size than the exhaust holes lying beneath the central portion of the supported glass sheet, regardless of where the edges of a particular sheet might lie above the bed. In one preferred embodiment of this invention, this is accomplished by establishing rows of uniform diameter exhaust holes across the support bed and selectively restricting the holes with a screening member having a desired pattern of varying size holes in spaced correlation with the holes of the support bed, to thereby restrict the exhaust openings at locations where the longitudinal edges of the supported glass sheet overlies the bed.

The attendant advantages of this invention and the various embodiments thereof will be readily appreciated as the same become better understood by reference to the following detailed description when considered in connection with the accompanying drawings in which:

FIG. 4A is a plan view of a portion of the support bed of FIGS. 1-3 showing two embodiments of screening tubes in the exhaust conduits and the relationship of the change in exhaust hole size with respect to the bed and an overlying sheet of glass that extends substantially the full width of the bed;

FIG. 4B is a plan view of the same support bed of FIG. 4A showing two embodiments of screening tubes in the exhaust conduits and illustrating an arrangement for use where an overlying glass sheet covers substantially less than the entire width of the support bed;

FIG. 5 is a perspective view of one embodiment of a screening means adapted for use with the support bed block of FIG. 3;

FIG. 6 is a transverse cross sectional view of the tubular screen of FIG. 5 taken along the line VI—VI of FIG. 5 and looking in the direction of the arrows;

FIG. 7 is another embodiment of a tubular screen adapted for use with the support bed block of FIG. 3;

FIG. 8 is a transverse cross sectional view of a tubular screen of FIG. 7 taken along the line VIII—VIII and looking in the direction of the arrows;

Figure 1:
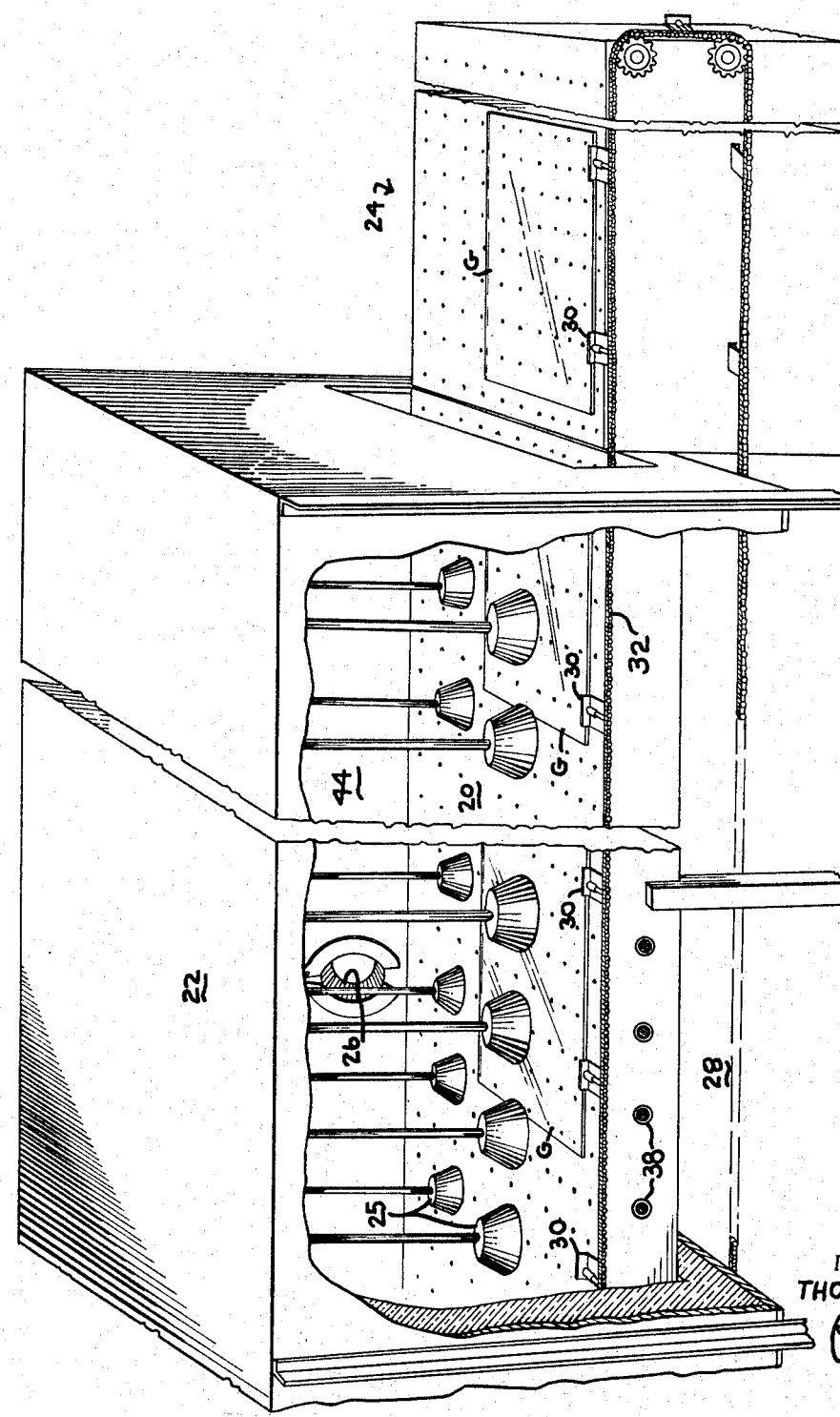
FIG. 1 is an isometric schematic view, with parts broken away, illustrating a portion of a heating furnace wherein glass sheets are supported above a gas support bed while being heated to a deformation temperature.

Referring to the drawings, FIG. 1 discloses a portion of a glass fabricating system for heating, optionally bending, and tempering sheets of glass. As diagrammatically shown, a generally elongated gas support bed 20 is provided for supporting and conveying sheets of glass to be fabricated. A portion of the support bed 20 is housed within a furnace enclosure 22. Preceding the furnace enclosure 22, in the direction of glass travel, is a loading area designated generally by the reference numeral 24. Bending and tempering zones (not shown) of the support bed 20 succeed that portion of the bed shown in FIG. 1. In the bending zone, the surface of the support bed 20 is gradually changed from flat to transversely curved, but is otherwise essentially the same as that portion shown. In the subsequent tempering zone, the glass sheets are supported on a flow of cooling gas from below and cooling gas is applied from above.

Within the furnace enclosure 22 and suspended from the roof portion thereof above the support bed 20 are radiant gas burners 25 for radiating heat toward the support bed 20 and glass sheets G being processed and for producing hot products of combustion. As is more clearly shown in FIG. 2, power driven blowers 26 are located in a vertical baffle or wall 44 along a sidewall of furnace enclosure 22. A plurality of perforate openings 48 are located at the base of baffle 44. An additional generally horizontal baffle 47 extends the length of baffle 44 between the baffle 44 and the support bed 20 and an additional generally vertical baffle 49 extends the length of support bed 20 between the bed 20 and the base of the furnace enclosure. Baffle 44 thus provides a channel 46 through which gas from above support bed 20 may be circulated by blowers 26 to a plenum chamber 28 formed by baffles 47 and 49, support bed 20, and the base of furnace enclosure 22.

Figure 2:
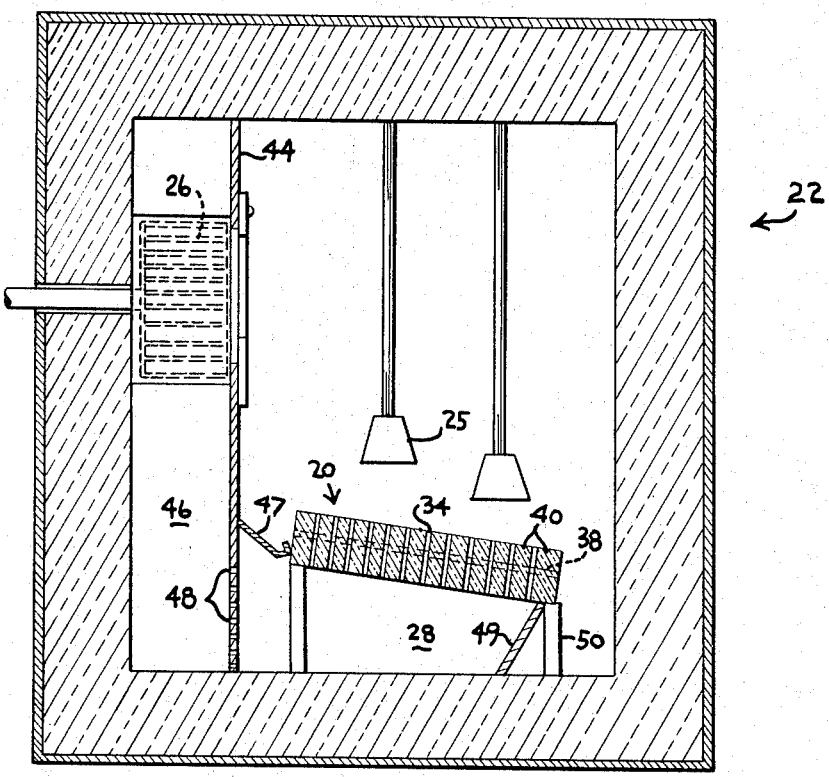
FIG. 2 is a transverse cross sectional view of the furnace of FIG. 1 illustrating the position of the gas support bed and showing the plenum chamber for the support bed and the blower for circulating support gases through the bed.

As shown in FIGS. 1 and 2, the support bed 20 is tilted at a slight angle (e.g., 8 to 12 degrees) from the horizontal in a sidewise direction. An endless driven chain 32 is guided along the lower longitudinally extending edge of the bed. Support feet 30, adapted to position and engage a lower edge of a glass sheet supported above the bed 20, are fastened to the chain at spaced intervals. With this arrangement, movement of chain 32 conveys gas supported glass sheets G along bed 20 by frictional engagement between support feet 30 and the glass resulting from the sidewise tilt of the bed.

Figure 3:
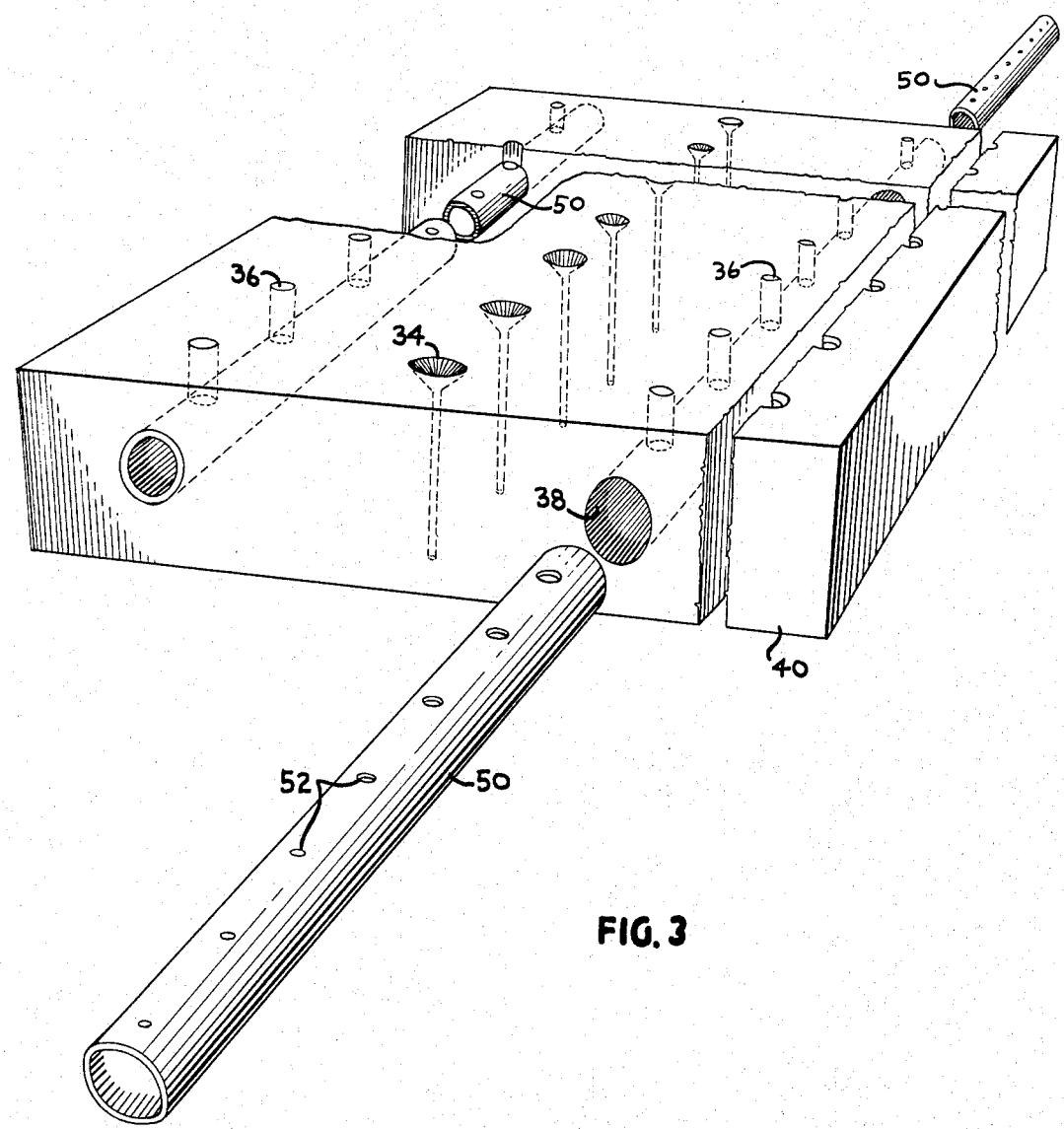
FIG. 3 is a perspective view of a block forming the support bed of FIGS. 1 and 2, and illustrating constructional details, and including the rows of inlet and exhaust holes, the exhaust manifolds, and the screening means for selectively varying the effective size of the exhaust holes.

Referring to FIGS. 1 to 3, the support bed is comprised of a series of support bed blocks 40, each block extending across the width of the bed and containing transverse rows of holes or perforations. Outlet holes 36 communicate with transversely extending manifolds or conduits 38 within the support bed blocks 40 which comprise support bed 20. Exhaust outlet holes 36 extend only partway through support bed blocks 40 and communicate with manifolds 38. Manifolds 38 open through the longitudinally extending sides of support bed blocks 40, in communication with the ambient atmosphere above and surrounding support bed 20.

Support bed blocks 40 are formed of a suitable heat resistant material, such as fused quartz, or other heat resistant ceramic suitable for use at the glass deformation temperatures at which glass sheets to be tempered or bent and tempered are processed. Blocks 40, are, as shown, generally rectangular, flat sections approximately 30 inches long and of the desired width of bed 20. Each section or block is provided with a plurality of rows of a plurality of perforations 34 to permit gas from plenum 28 to flow upwardly through the bed to heat and support a glass sheet overlying the bed. Disposed between the transverse rows of inlet perforations 34 are alternate rows of exhaust perforations or outlets 36 extending partially through the block 40 and communicating with transverse passages 38. The inlets 34 are preferably beveled or chamfered at the top surface of block 40, as shown in FIG. 3, to provide a flare. Suitable inlet perforations 34 are about ⅛ inch in diameter and the chamfers are approximately ⅜ of an inch in diameter at the top surface of the bed. The depth of the flare may be approximately ¼ of an inch. The exhaust perforations are approximately ¼ inch in diameter. Both the inlet and exhaust perforations may be 1½ inches apart longitudinally of the bed and ½ inch apart laterally. The inlet and outlet perforations may be staggered with respect to the next adjacent perforations in a direction generally longitudinally of the bed. Suitable manifolds or conduits 38 may be approximately 1 inch or more in diameter.

Referring specifically to FIG. 3, tubular screen elements 50 have been provided of slightly smaller diameter than the diameter of conduits 38 in blocks 40 and each screen element is adapted to fit securely in a conduit 38 and to extend only part-way across the support bed, one from each side. Each screen element 50 has a row of orifices 52 of graduated diameter and spaced along the element in correlation with the spacing of exhaust outlets 36 of blocks 40. The smallest orifices of each element 50 are located adjacent the end thereof that will be positioned closest to the longitudinally extending edge of block 40 so the effective orifice size of exhaust outlets 37 will increase from the edge of support bed 20 toward the center of the bed. Specific arrangements of the support block 40 and screen elements 50 for different widths of glass sheets supported upon bed 20 are shown in more detail in FIGS. 4A and 4B.

FIGS. 4A and 4B each depict a longitudinal fragment and the full width of a support bed 20, including two rows of chamfered inlet holes 34 and two rows of exhaust outlet holes 36. FIG. 4A illustrates the construction and location of tubular, perforated, screen elements 50 as they are arranged in a transversely extending conduit 38 where a sheet of glass covers essentially the full width of bed 20. By way of example, and as diagrammatically shown in FIG. 4A, where the width of support bed 20 is such that there are forty-two exhaust outlets 36 across the bed and forty are covered by the width of the glass sheet being supported, it is desirable to have the first four exhaust perforations adjacent the side edges of the support bed at an effective diameter of approximately ⅛ inch. The next five exhaust perforations 36 toward the center of the block from each side should have an effective diameter of about 3/16 inch and the central portion of about 24 perforations 36 should be the full diameter of the exhaust perforations 36, i.e., ¼ inch in diameter. Such an arrangement provides adequate and uniform gas support for the sheet substantially from edge to edge thereof, assuring that the deformable glass sheet will have the precise shape determined by the contour of the support block 40. The proper effective diameters of the ¼ inch exhaust outlets 36 of blocks 40 are attained by inserting a tubular perforated screen element 50 into the conduit 38 from each side of the support bed 20. The length of screen elements 50 in this example is selected so the elements enter the conduits 38 to a distance of 9 exhaust holes on each side. The screen elements 50 have restrictive orifices 52 spaced in a row in correlation with the exhaust outlets 36 of bed 20, the first four that are to be located nearest the longitudinally extending edge of the bed being ⅛ inch in diameter and the next five to be located more centrally of the bed and adjacent the opposite end of the screen element being 3/16 inch in diameter. As will be evident, when the entire width of the bed is covered by a sheet of glass G, as illustrated, the arrangement of the effective diameters of the exhaust outlets is symmetrical about a longitudinal center line of the bed.

An an alternative to the use of two screen elements 50, one inserted from each side of the bed and terminating at the last hole where the effective diameter is less than the actual diameter of the exhaust outlet 36, a single tubular perforated screen element that extends across the entire width of the bed may be used. This is illustrated in the lower row of exhaust holes in FIG. 4A, where there is shown a single screen element 55. This element is shown in more detail in FIGS. 5 and 6. Screen element has as many perforations as there are exhaust holes in the bed and the diameters of the perforations are selected in accordance with the desired pattern. That is, in the above example, the twenty-four center most perforations would have a diameter of ¼ inch and hence would have no effect on the exhaust outlets of the bed. This embodiment is particularly advantageous where only one side of the support bed is convenient for access for inserting screen elements.

FIG. 4B illustrates a support bed 20 where a sheet of glass G covers only a portion of the width of the bed. By way of example, a sheet of glass may cover only thirty-six of the forty-two exhaust holes extending across the supported bed. As with the larger sheet, uniform support is best achieved by reducing the effective orifice size of the exhaust outlets adjacent the longitudinally extending edges of the glass sheet. Furthermore, the arrangement of exhaust hole sizes beneath the width of the sheet should be symmetrical about a longitudinal center line of the sheet. Because the sheet is moved along the lower edge of the support bed along the same reference line as a larger sheet, as determined by the conveying mechanism, the symmetrical arrangement of exhaust hole sizes beneath the glass sheet cannot be symmetrical with the bed. In this case, and as shown diagrammatically in FIG. 4B, it is desired that the first three exhaust holes beginning at the engaged edge of the sheet along the reference line have an effective diameter of ⅛ inch, the next three a diameter of 3/16 inch, the next twenty-four a diameter of ¼ inch, the next three a diameter of 3/16 inch and the next three a diameter of ⅛ inch. The remainder of the exhaust holes across the bed that are not covered by the glass sheet have no effect on the support and may be of any effective diameter or may be completely blocked off. Control of the effective diameters of the exhaust holes 36, in accordance with the above desired arrangement, may be accomplished by inserting a relatively short tubular perforated screen element 50 in the lower side of support bed 20, along which the glass sheet is engaged by the conveying mechanism. This element 50 would extend inwardly a distance of six exhaust holes and would have six perforations 52 correlated in spacing with the larger exhaust holes 36 of the bed. A longer tubular perforated screen element 50 would then be inserted from the opposite side of the bed and would extend inwardly so as to underlie the six exhaust holes of the bed beneath the other longitudinally extending margin of the glass sheet and would modify the effective orifice size of these outlets in accordance with the desired pattern. Alternatively, as also shown in FIG. 4B in the lower row of exhaust holes 36, a single tubular perforated screen element 55 of the type shown in FIGS. 5 and 6 may be used. This element need only extend across the support bed 20 a distance of the thirty-six exhaust holes that underlie the glass sheet.

FIGS. 7 and 8 show a perforated tubular screen element 57 having a plurality of rows of orifices each extending axially of the tube and spaced from each other peripherally of the tube. The size and pattern of the orifices of each row in tube 57 differs so that one tube may be used to provide several different patterns of effective exhaust hole sizes across the bed 20. For example, the tube of FIGS. 7 and 8 may be used to control the exhaust hole sizes for four different widths of glass sheets by orienting the appropriate row of holes directly beneath the exhaust outlet holes 36 of the bed.

Figure 9:
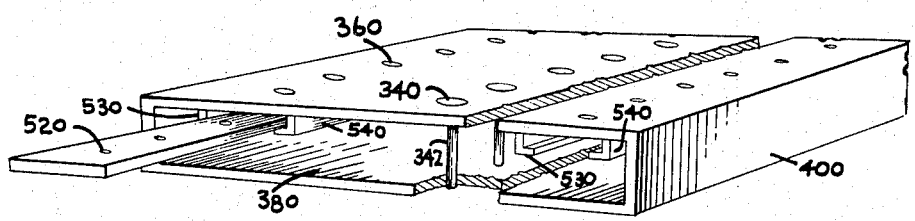
FIG. 9 is a perspective schematic view of another embodiment of a support bed section and including a flat screen for controlling the size of the exhaust holes.
Figure 10:
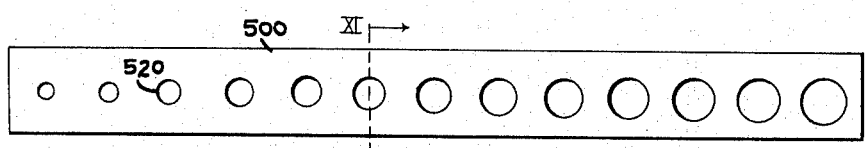
FIG. 10 is a plan view of a flat perforated screen of the type shown in FIG. 9 illustrating one arrangement of hole size variation.
Figure 11:
FIG. 11 is a transverse cross sectional view of the flat screen of FIG. 10 taken along line XI—XI of FIG. 10 and looking in the direction of the arrows.

A further modification of the apparatus of this invention is shown in FIG. 9. A hollow support bed block or bed section 400 is shown having chamfered gas inlet holes 340 and exhaust outlets 360 in the same general arrangement as described above in connection with the embodiment of FIGS. 1 to 4. Exhaust outlets 360 communicate directly with an exhaust chamber 380 formed by the hollow support bed block 400. Inlet holes 340 are connected by tubes 342 through the lower wall of block 400 to the plenum chamber 28. The effective orifice size of exhaust outlets 360 is controlled by a flat perforated screen element 500 having orifices 520 of varying size to change the effective diameter of outlets 360 in the same manner as previously described in the embodiment of FIGS. 1 to 4. Screen elements 500 are supported beneath exhaust outlets 360, in contact with the lower surface of the upper wall, or top, of hollow support bed blocks 400, by L-shaped brackets 530 and 540.

In operation, perforated screen elements having an arrangement of perforations suitable for the width of the glass sheet to be processed, as disclosed in detail above, are placed in the exhaust passageways of support blocks 40 of gas support bed 20, particularly along that portion of support bed 20 where the glass is readily deformable and conforms to the contour of the support bed. For example, where a flat glass sheet is to be bent, the glass sheet is supported above the support bed 20 a distance of about 0.005 to 0.020 inch in that portion of the bed where the contour changes from flat to curved and throughout the following curved section. At such a support height, uniform support is essential and, therefore, accurate and proper control of exhaust flow is required. The same is true of a flat bed in that portion of the bed where the glass reaches deformation temperature prior to tempering. If the support is not uniform, the sheet will not conform to the desired shape or flatness.

Radiant gas burners 25 radiate heat toward the upper surface of support bed 20 and supply hot products of combustion at a deformation temperature of the glass (i.e., at a temperature of about 980 degrees Fahrenheit and above and usually at a temperature of 1100 to 1300 degrees Fahrenheit or greater) to the atmosphere within furnace 22. Power driven blowers 26 circulate these hot products of combustion from the zone above the support bed 20 through channel 46 through orifices 48, and into plenum 28 beneath the support bed 20. By way of example, a flow rate of approximately 3500 cubic feet per minute per square foot of bed area and a gas pressure of approximately 1.8 to 2.5 inches of water column pressure in the plenum are provided. Under such conditions, a sheet of conventional soda-lime-silica window or plate glass approximately 3/16 inch thick will float a distance of about .005 to 0.020 inch above the upper surface of the support bed. The gas providing this support is supplied from plenum chamber 28 through gas inlets 34 to the zone above support bed 20 beneath the supported glass sheets. This gas then flows to an adjacent exhaust outlet 36 and, thence, through a manifold or conduit 38 to the lower pressure atmosphere surrounding the upper portion of support bed 20. Screen elements within conduits 38 control the effective diameter of exhaust outlets 36 to reduce the amount of support gas escaping through exhaust outlets 36 beneath the longitudinally extending edges of the support glass sheet as compared with the amount of support gas escaping through exhaust outlets 36 located centrally of the supported glass sheet. The support bed 20 is tilted at a sidewise angle of between about 8 to 12 degrees from the horizontal and the support feet 30 of chain 32 properly locate and convey the sheets of glass along the support bed with the bottom edges of each sheet of glass located along a predetermined reference line adjacent the lower longitudinally extending edge of support bed 20.

When it is desired to process sheets of glass of different size from those presently being processed, the screen elements 50 are changed to provide a new pattern of control orifices for exhaust outlets 36, in accordance with the new width of the glass sheets to be processed.

The particular pattern of control orifices of screen elements 50 to be used may readily be determined by the width of the glass sheet to be processed. A satisfactory pattern is best determined experimentally, but should at least restrict the first two exhaust outlets covered by the glass sheet along each longitudinally extending edge thereof and, particularly with wider sheets, may restrict additional holes. One accurate method of determining the most efficient orifice size of the holes in the perforated screen element is to measure the pressure profile that exists when the bed 20 is covered to the width of the glass to be processed and to then modify the profile by experimentally changing the restrictive orifices of screen elements 50.

A pressure profile across top surface of the support bed 20 may be determined in the following manner:

A pressure sensing plate having a small hole therethrough is positioned above the bed and spaced therefrom a distance corresponding to the height of a supported glass sheet, e.g., 0.010 inch. A pressure transducer is connected to the sensing hole and the electrical output of the pressure transducer is connected to a recorder that will graph pressure variations on one axis and displacement of the pressure sensing plate on the other axis. The pressure transducer controls the displacement of the recording device along, e.g., the Y axis of the graph. A potentiometer, the shaft of which is rotated by relative horizontal movement between the sensing plate and the support bed, translates such movement to an electrical signal that controls the displacement of the recording device along the other, or X axis of the graph.

Various modifications of the above-described embodiment will become apparent to those skilled in the art. In particular, it should be evident that the above arrangement, although disclosed in connection with a flat support bed, is equally applicable and is intended to be used with a support bed that is curved either transversely to the direction of glass travel or longitudinally thereof, or both. Where the curvature is slight, only the top surface of support blocks 40 need be contoured and the remaining structure will require no change. However, where the change in curvatures is extreme, i.e., the radius of curvature is small, the entire block 40 may be made curved and, when this curvature is in a direction transverse of the path of glass travel, exhaust conduits 28 may be similiarly curved. As long as the radius of curvature is constant, the tubular perforated screen elements may merely be curved to the same radius of curvature and be readily insertable and removable. Where the radius of curvature is not constant, the screen elements may be made sufficiently flexible to traverse the conduit. In such an instance, it is desirable to insert short screen elements from both sides of the support bed rather than to insert one element extending from one side to the other.

It should be evident that, while in the foregoing disclosure certain preferred embodiments of the invention have been disclosed, numerous modifications or alterations may be made therein without departing from the spirit and scope of the invention as set forth in the appended claims.

I claim:

1. In a fluid support bed for providing fluid support for sheets of material, a plenum chamber including a top to said plenum chamber, said top having an upper generative surface above which a sheet of material may be supported on a flow of gas, first spaced rows of spaced holes through the top of said plenum chamber across and along the upper generative surface, said holes being constructed and arranged to supply gas from the plenum chamber to a zone above the generative surface, second spaced rows of spaced holes alternating with said first spaced rows along the upper generative surface, said holes being constructed and arranged to exhaust gas from the zone above the generative surface, a manifold common to the spaced holes of each of said second spaced rows and communicating between the spaced holes and the ambient atmosphere external to the plenum chamber, a removable tube in each of a plurality of said manifolds, each said tube having a row of spaced holes at least some of which are smaller than the holes of said second spaced rows across the upper generative surface of the plenum chamber, the spaced holes of said tube being constructed and arranged to restrict the flow of exhaust gas through at least some of the holes of said second spaced rows.

2. Apparatus for supporting a sheet of glass upon a flow of gas, comprising a gas support bed having a plurality of support gas outlets for emitting support gas under pressure and a plurality of individual exhaust conduits having exhaust gas outlets for permitting gas to escape from above the bed to zones of lower pressure beneath a sheet of glass supported above the bed, means to supply gas under pressure at a glass deformation temperature to the said support gas outlets and removable tubular means disposed transversely of said exhaust conduits, said tubular means having orifices therein at least some of which are smaller than said exhaust gas outlets, and means for detachably securing said tubular means beneath said support bed, the smaller orifices of said tubular member each being positioned therein to cooperate with an exhaust gas outlet of one of said exhaust conduits to restrict the flow of exhaust gas through said cooperating exhaust conduit.

3. Apparatus for providing a fluid support for sheets of glass along a selected path comprising a plenum chamber having a top, said top having a support surface above which a sheet of glass may be supported on a flow of gas, said support surface having a width at least as wide as the glass sheets to be supported and conveyed and a length extending along the selected path, said top having spaced rows of spaced conduits extending therethrough and terminating in openings in said top extending across and along said support surface for supplying gas from said plenum chamber to a zone above said support surface, said top having second spaced rows of spaced conduits extending therethrough and terminating at the upper end in openings in said top alternating with said first-named openings and at the lower end in outlets for exhausting gas from above said support surface into an exhaust chamber, a removable tubular member having at least one row of aligned spaced orifices at least some of which are smaller in size than said outlets of said exhaust conduits, and means for detachably securing said removable tubular member in a position immediately beneath said plenum top, the spaced smaller orifices of said tubular member each being positioned in said tubular member to cooperate with an outlet of one of said exhaust conduits to restrict the flow of exhaust gas through said cooperating exhaust conduit.

4. The apparatus of claim 2 wherein said spaced smaller orifices of said tubular member are each positioned in said tubular member to cooperate with one of said exhaust conduits that is beneath a supported glass sheet and adjacent one of the opposite edges of said supported glass sheet to restrict the flow of gas through said cooperating exhaust conduit.

5. Apparatus for providing a fluid support for sheets of material along a selected path comprising a plenum chamber having a top, said top having an upper support surface above which a sheet of material may be supported on a flow of gas, said top having spaced rows of spaced conduits extending therethrough and terminating in openings in said top extending across and along said support surface for supplying gas from said plenum chamber to a zone above said support surface, said top having second spaced rows of spaced conduits extending therethrough and terminating at the upper end in openings in said top alternating with said first-named openings and at the lower end in outlets for exhausting gas from above said support surface into an exhaust chamber, a removable plate element having a plurality of orifices at least some of which are smaller in size than said outlets of said exhaust conduits, and means for detachably securing said removable plate element in a position immediately beneath said plenum top, the spaced smaller orifices of said plate element each being positioned in said plate to cooperate with an outlet of one of said exhaust conduits to restrict the flow of exhaust gas through said cooperating exhaust conduit.

6. The apparatus of claim 5 wherein the plate element has the same configuration of the support surface.

References Cited
UNITED STATES PATENTS

| 1,622,817 | 3/1927 | Waldron | 65—182 X |
| 3,300,290 | 1/1967 | Misson | 65—25 |

DONALL H. SYLVESTER, *Primary Examiner.*

A. D. KELLOGG, *Assistant Examiner.*